United States Patent [19]

Seymour

[11] Patent Number: 5,771,003

[45] Date of Patent: Jun. 23, 1998

[54] LOCATING SYSTEM AND PROCESS

[75] Inventor: Arthur F. Seymour, Deerfield, Ill.

[73] Assignee: Elenco Electronics, Inc., Wheeling, Ill.

[21] Appl. No.: 719,954

[22] Filed: Sep. 24, 1996

[51] Int. Cl.[6] .................................................. G09B 13/14
[52] U.S. Cl. .................... 340/568; 340/572; 340/825.31; 340/825.34; 209/571; 209/598; 235/441; 235/451
[58] Field of Search ................................. 340/568, 572, 340/825.34, 826.31; 235/451, 375, 441, 492, 440, 442

[56] References Cited

U.S. PATENT DOCUMENTS

| | | | |
|---|---|---|---|
| 3,176,841 | 4/1965 | Staats | 209/571 |
| 3,283,571 | 11/1966 | Powell | 340/149 |
| 3,504,343 | 3/1970 | Ditlow | 340/149 |
| 3,666,925 | 5/1972 | Marcus | 235/61.11 |
| 3,847,459 | 11/1974 | Hegedus et al. | 312/184 |
| 4,100,856 | 7/1978 | Ziemba | 102/206 |
| 4,300,040 | 11/1981 | Gould et al. | 235/381 |
| 4,338,644 | 7/1982 | Staar | 360/132 |
| 4,376,936 | 3/1983 | Kott | 340/825 |
| 4,458,802 | 7/1984 | Maciver et al. | 235/381 |
| 4,528,643 | 7/1985 | Freeny, Jr. | 364/900 |
| 4,636,634 | 1/1987 | Harper et al. | 250/223 R |
| 4,691,339 | 9/1987 | Redman et al. | 379/62 |
| 4,814,742 | 3/1989 | Morita et al. | 340/825.54 |
| 4,839,875 | 6/1989 | Kuriyama et al. | 369/14 |
| 4,982,070 | 1/1991 | Bezin et al. | 235/378 |
| 5,028,766 | 7/1991 | Shah | 235/381 |
| 5,455,409 | 10/1995 | Smith et al. | 235/385 |
| 5,633,490 | 5/1997 | Vandenengel | 235/492 |

*Primary Examiner*—Jeffery Hofsass
*Assistant Examiner*—Benjamin C. Lee
*Attorney, Agent, or Firm*—Thomas W. Tolpin

[57] ABSTRACT

A user-friendly process and fail safe system instantaneously identifies, locates, and help retrieve products and their contents in drawers, shelves, rooms, offices, stores, warehouses, etc. The efficient process and economical system is particularly useful to quickly and accurately identify, locate and help retrieve: computer discs, compact discs, software diskettes, video tapes, audio tapes, and their cases; books; files; boxes, cartons, storage bins, and other containers. In the reliable process and low power system, an electrically conductive label is placed on each product. Each label is easily coded to uniquely specify the product or its contents and storage location. Light emitting diodes (LEDs) or other visual, audible or mechanical signaling devices are positioned in proximity to the stored products and are in electrical contact with the labels on the products, as well as with a central processing unit (CPU) or other equipment used to specify and select the product. When a product is to be retrieved, the CPU or other equipment shuts off the LEDs or other visual or audible signal devices positioned in proximity to all the products not desired, leaving only the desired or failed items for easy identification and retrieval.

21 Claims, 14 Drawing Sheets

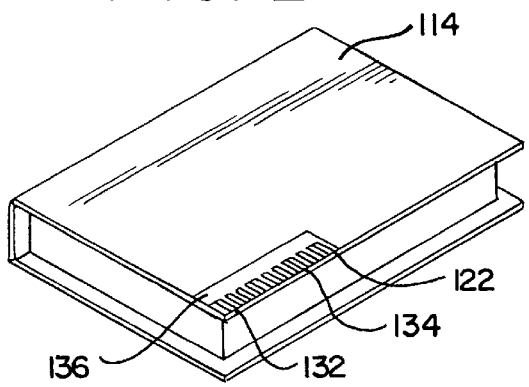
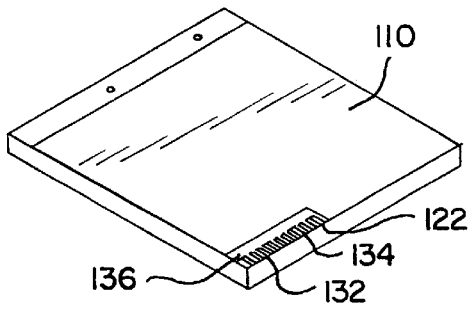
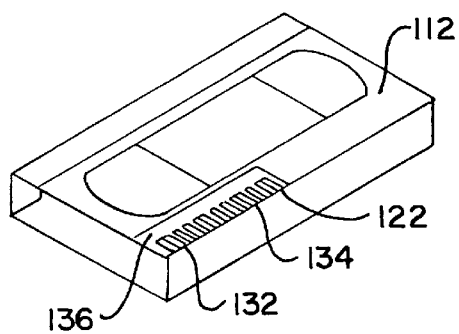
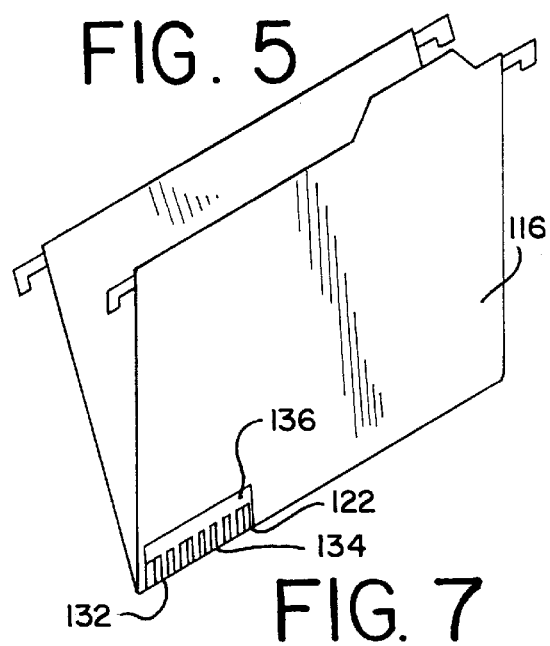
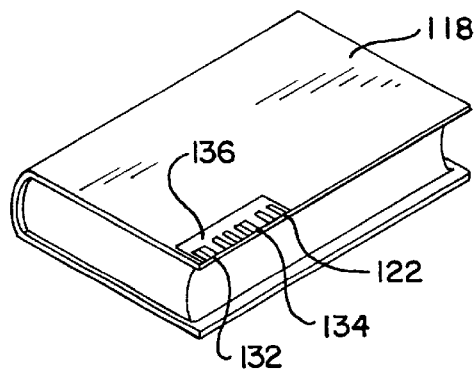
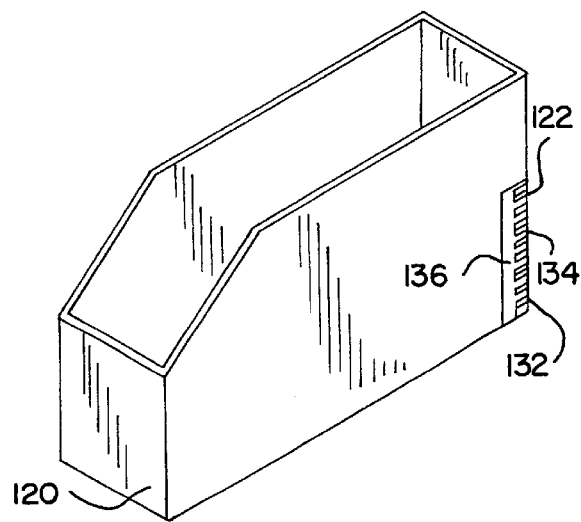

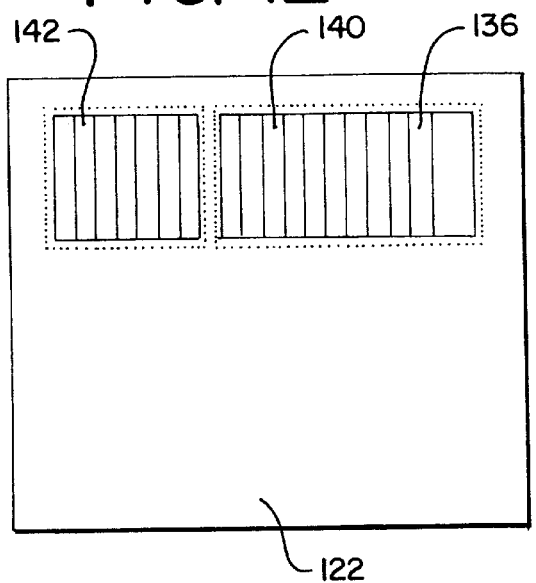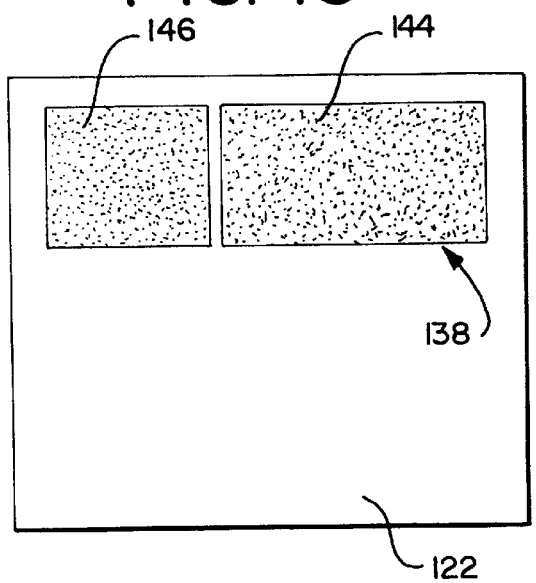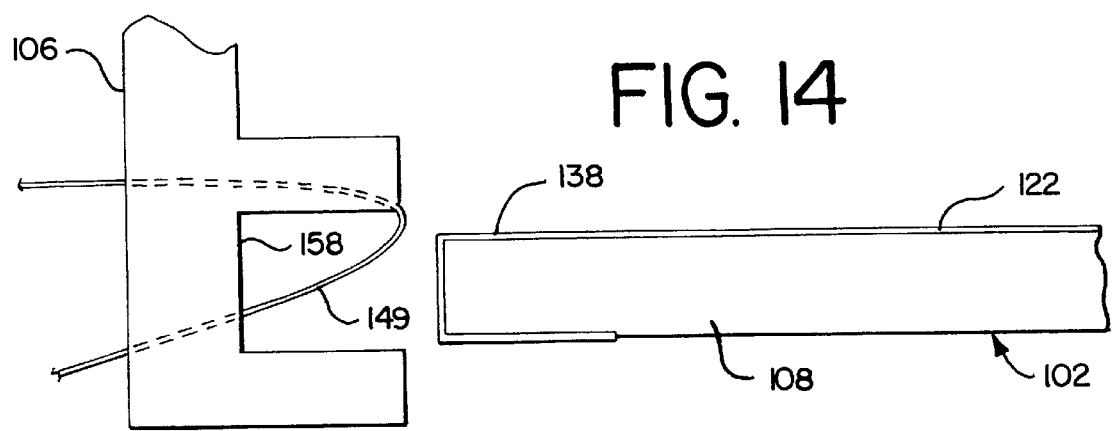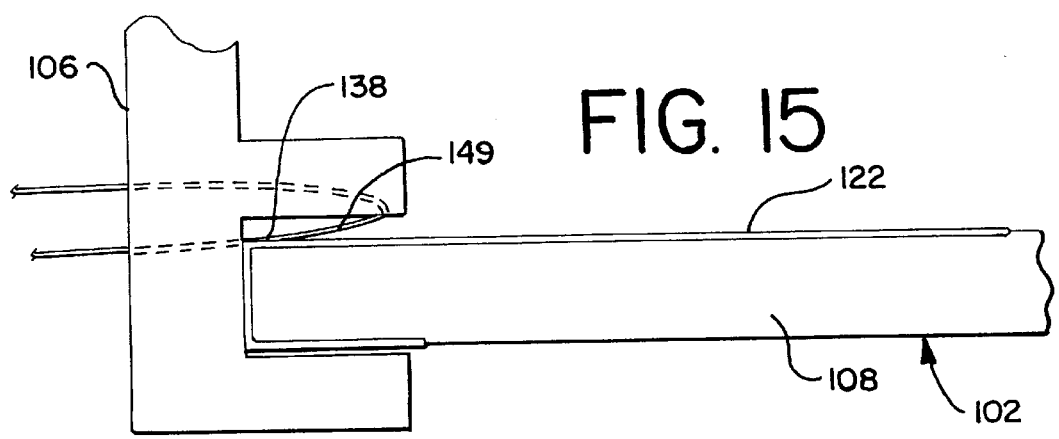

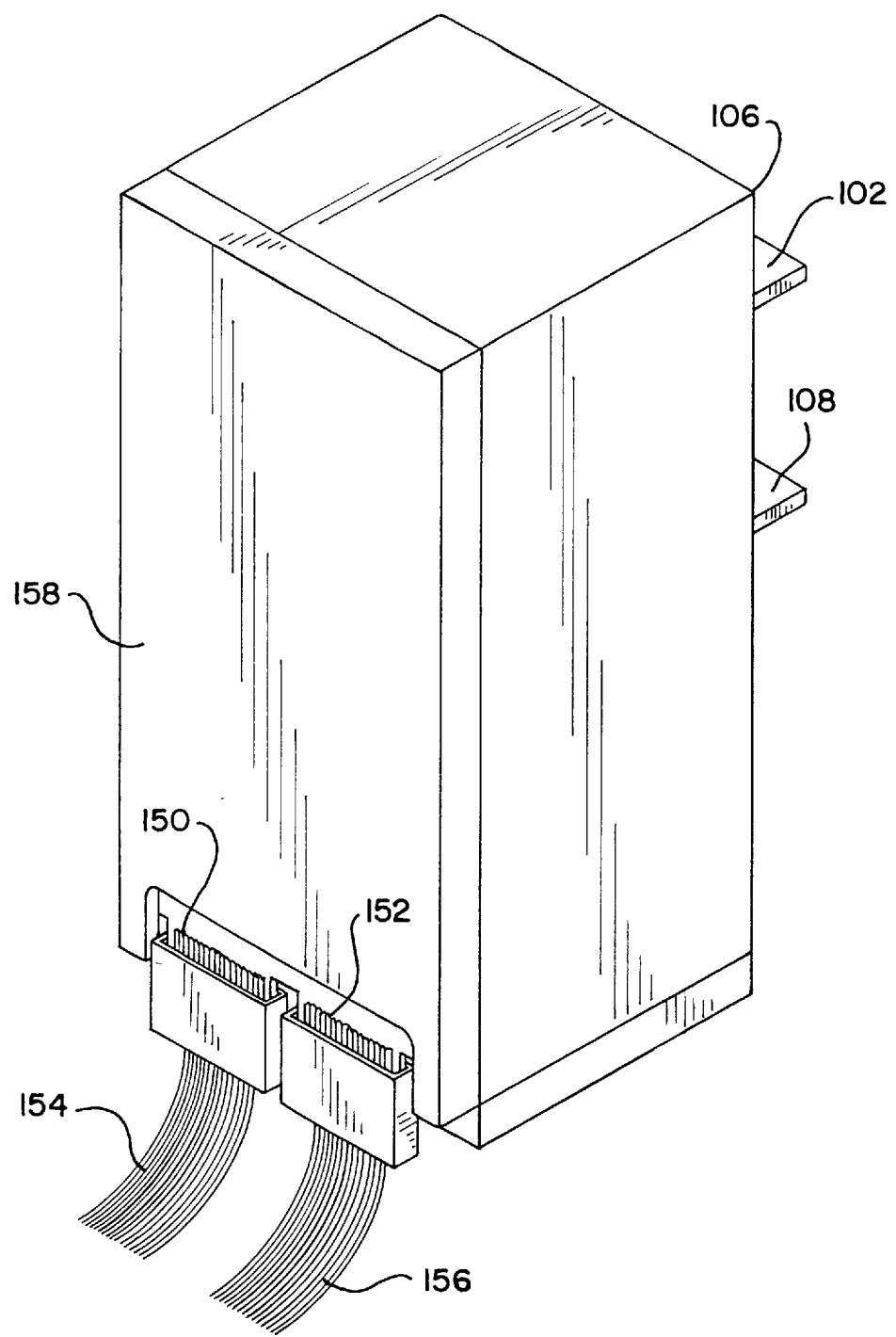

LOCATING SYSTEM AND PROCESS

BACKGROUND OF THE INVENTION

This invention pertains to product identification and retrieval and, more particularly, to a system and process for locating and retrieving various products.

Many places store vast quantities of goods. For example, libraries shelve volumes of books and magazines and offer numerous selections of microfilm in cabinets. Data processing centers have rooms of magnetic tape reels (computer tapes) for mainframe computers. Word processing centers and computer users utilize large quantities of computer discs for industry and universities. Software stores have boxes of software. Video stores provide shelves of video tapes. Music stores have a wide selection of compact discs and audio tapes. Movie industries, television studios, and radio stations keep volumes of film and tapes. Large warehouses and enormous discount stores have racks and pallets of various goods. Retailers and wholesalers provide aisles of shelves with a variety of products. Manufacturing companies have bins, containers, boxes, barrels, cabinets, etc. containing a variety of components, parts, materials and other items for assembly or use in manufacturing processes. Petrochemical plants, oil refineries and airports have buildings containing spare parts, pipe fittings, valves, maintenance equipment, etc. Pharmaceutical companies and food processing plants have storage facilities for equipment, replacement parts, and material. Research and development facilities and marketing companies have reams of data. Law firms, auditors, public accounting firms, advertising agencies, architectural firms, hospitals, physician offices and government agencies have numerous file cabinets with vast amounts of files. Credit card companies and retailers warehouse boxes of credit card receipts. Banks store a variety of bank receipts and other documents.

Over the years, a variety of techniques have been implemented or suggested to identify and retrieve various items, such as the articles, objects and products described above. Such techniques have included the use of index cards in drawers of libraries utilizing the dewey decimal classification system. Index cards in libraries are generally alphabetized by subject matter and author. Books are identified by manually searching the index cards by hand in libraries to learn the classification number of the book. Once the user identifies the classification number of the book, the user must find the actual shelf where the library book is normally stored. This is not quick and easy task in large libraries. Data bases utilizing alphanumeric identification numbers and binary numbers have been used. Numerous complex mechanisms, mechanical devices, and electrical system have also been suggested. The above techniques, mechanisms, mechanical devices and conventional electrical systems have met with varying degrees of success.

It is, therefore, desirable to provide an improved locating system and process, which overcomes most, if not all, of the preceding problems.

SUMMARY OF THE INVENTION

An improved process and system is provided to rapidly and accurately locate items, articles, goods and products, such as: computer discs, software diskettes, video tapes, video tape cases, audio tapes, audio tape cases, computer tapes and reels, compact discs, compact disc cases, software boxes, books, magazines, storage bins, file folders, hanging files and other files, as well as boxes, cartons, and other containers. Advantageously, the user-friendly process and locating system are easy-to-use, reliable and attractive. Moreover, the timesaving inventory process and retrieval system are economical, efficient and effective.

In the novel process and system, the item to be retrieved is electronically identified, specified, detected, sensed, and selected in an apparatus or equipment, such as with: a keyboard of a central processing unit (CPU), a computer, an electronic logic board, a microprocessor, mechanical switches, or other mechanisms, instruments or devices. The apparatus can be manually, automatically or remotely operated. A signal, such as a visual signal, audible signal, mechanical signal, alarm or light, can be concurrently generated in the area where the item is located in response to the electronic identification, specification, detection, sensing and/or selection of the item. The signal can be emitted by a light emitting diode (LED), lightbulb, lamp, illuminator, bell, or other signaling device. The signaling device can also comprise a release mechanism or other device to mechanically eject (pop out) or remove the desired item. Preferably, the signal is generated and activated in a section of the area where the item is located and most preferably in proximity to the item to be retrieved. In order to provide a low power, fail-safe process and system, a signal can be generated when an item is stored in an incorrect location so that all signals are shorted and turned off, except the desired signal(s) corresponding to the item selected to be retrieved.

Preferably, an electrically conductive label is placed on each item stored in the system. The electrically conductive label can comprise a composite label with insulating material overlying a conductive area. The conductive area can comprise an electrically conductive material, such as: metal, metallic foil, copper, or conductive ink. The insulating material can comprise: paper, paper tabs, paperboard, cardboard, plastic tabs, rubber, zinc oxide, tin oxide or other non-conductive materials. Each item can be differently and individually coded and electronically identified by removing some of the insulating material, overlying the conductive area, to designate an item code which specifies the item or its contents and a section code which specifies the location where the item is normally stored. Preferably, the section code also specifies and corresponds to a section in the area where the item is located. In this matter, each item and its contents can have its own unique code and separate identification, which distinguishes it from every other item in the system by item type, classification, and location.

Desirably, the apparatus electrically selects the item to be retrieved, as requested or designated by the person seeking to retrieve the item, and generates an electrical impulse towards the electrically conductive label of the selected item. A control circuit can operatively connect the apparatus to the signals and activates a signal in proximity to the selected item to be retrieved in response to the electrical impulse to identify the location of the selected item. In the preferred form, the control circuit comprises inverted buffers, resistors and transistors, which are operatively connected to each other, and to the signaling devices, preferably light emitting diodes, as well as to metal contacts of the electrically conductive labels.

The preferred process and system is a non-contact reverse, negative, opposite or shut-off signaling method, procedure and system in which the signal is one of non-contact and in which the signals generated comprise shut-off signals or pulses. While analog codes and signals can be useful, binary codes and signals with 0s and 1s are preferred for best results. Furthermore, binary codes and signals are readily expandable to include a voluminous and almost infinite number of items, as well as the area, section and specific location where each item can be found and retrieved. Moreover binary codes and signals help provide a better fail safe process and system. When binary pulses (binary coded signals) are generated to select the item to be retrieved, only one label on the items remains insulated from the pulses and does not contact, receive, detect or accept the binary shut-off pulses. As a result, all the light emitting diodes or other signals are shorted and shut-off, so that they will not light or emit a visual or audible signal, while the desired light emitting diode(s) or signal(s) at the location of the selected item is insulated from the shut-off (shunting) pulses and will continue to beam a light or emit a visual or audible signal to identify the location of the item selected for easy retrieval.

A more detailed explanation of the invention is provided in the following description and appended claims taken in conjunction with the accompanying drawings.

BRIEF DESCRIPTION OF THE DRAWINGS

FIG. 2 is a perspective view of a labeled video tape case for use with the locating system and process;

FIG. 3 is a perspective view of a labeled compact disc (CD) case for use with the locating system and process;

FIG. 4 is a perspective view of a labeled video tape for use with the locating system and process;

FIG. 5 is a perspective view of a labeled hanging file for use with the locating system and process;

FIG. 6 is a perspective view of a labeled book for use with the locating system and process;

FIG. 7 is a perspective view of a labeled storage bin for use with the locating system and process;

FIG. 12 is a front view of the insulating tabs of the label;

FIG. 13 is a front view of metal contacts of the label;

FIG. 14 is a fragmentary side view of a labeled disc being inserted into a wire contact of a slot in a cabinet;

FIG. 15 is a fragmentary side view of the labeled disc in the slot of the cabinet and engaged against the wire contact;

FIG. 16 is a perspective view of the back of a cabinet containing labeled discs for use in the locating system and process;

DETAILED DESCRIPTION OF THE PREFERRED EMBODIMENT

Figure 1:
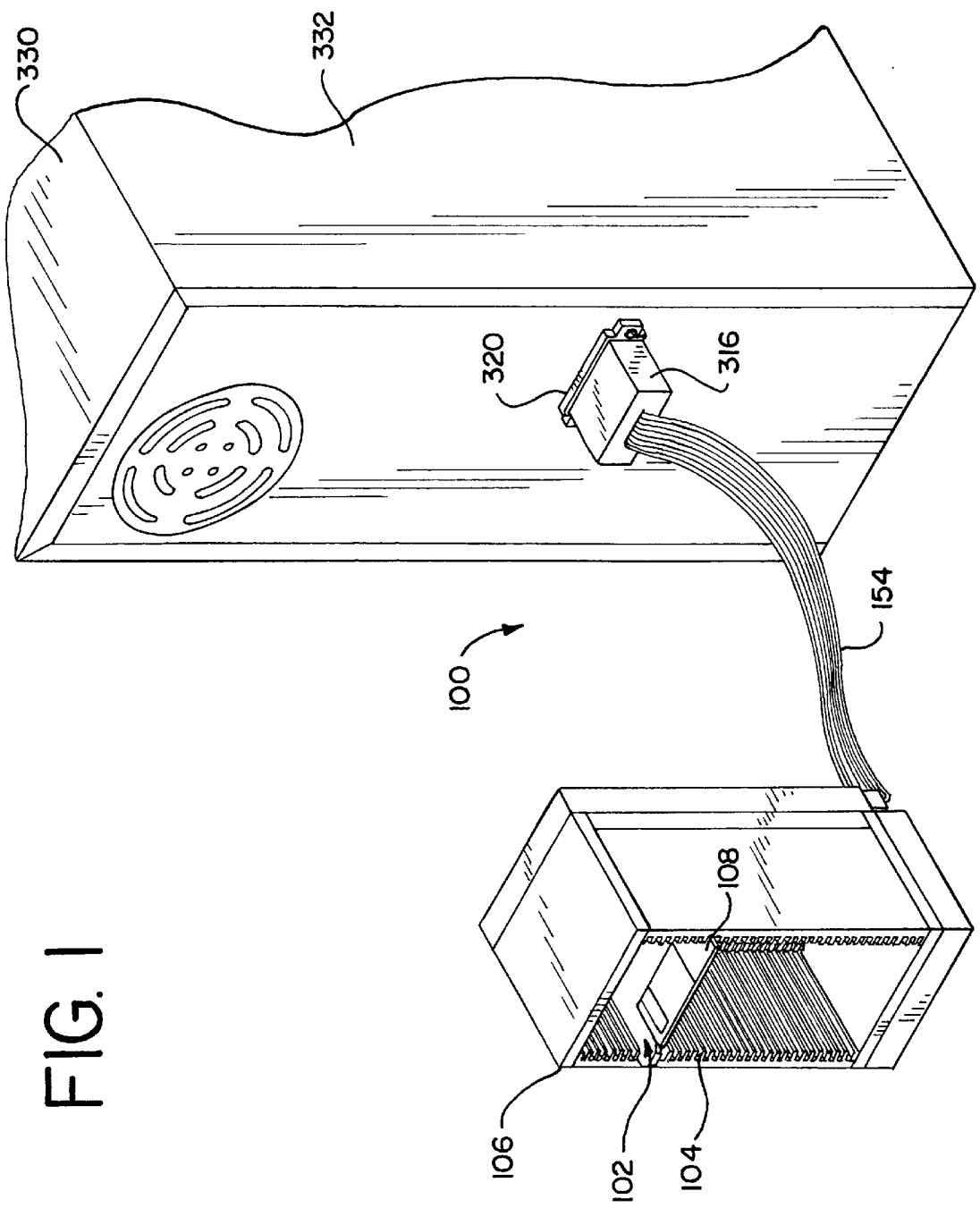
FIG. 1 is a perspective of part of a locating system and process in accordance with principles of the present invention.
Figure 8:
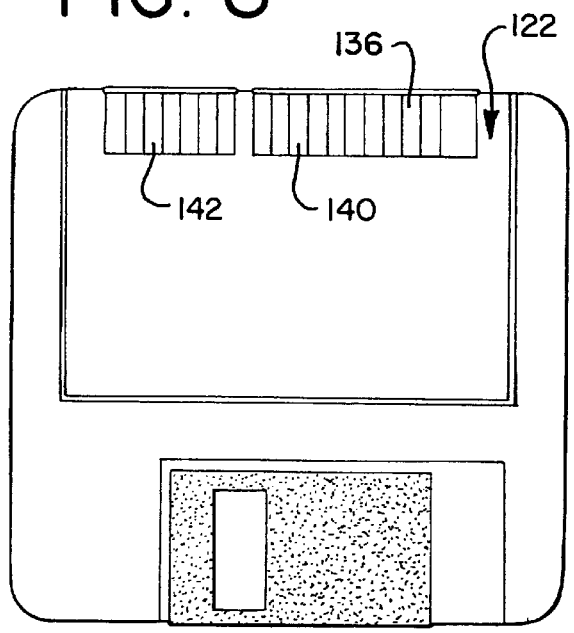
FIG. 8 is a front view of a disc with a composite conductive label in accordance with principles of the present invention.

A low power, fail safe, locating, retrieval and inventory, fast find process and system 100 (FIG. 1) quickly and accurately identifies, locates and help retrieve products 102 (items, articles or objects) and their contents in racks 104, cabinets 106, shelves, drawers, pallets, rooms, offices, stores and warehouses. The reliable process and low cost system rapidly and efficiently identify, locate and help retrieve many different types of products (items) such as: computer discs 108 or software diskettes; compact discs (CDs) and CD cases 110 (FIG. 3); video tapes 112 (FIG. 4); cases 114 (FIG. 2) for video tapes (videos and video cartridges) and audio tapes; files and file folders such as hanging file folders 116 (FIG. 5); books 118 (FIG. 6) and magazines; computer tapes, reels and cases; and containers, boxes, cartons, barrels and storage bins 120 (FIG. 7) for containing various items.

Figure 10:
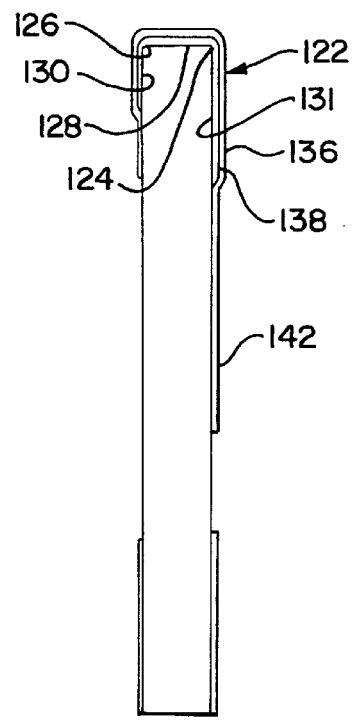
FIG. 10 is a side view of the disc and label.

In order to uniquely specify the product and/or its contents as well as its storage location, an electrically conductive composite label 122 (FIGS. 2–14) is placed and attached to the exterior surface of the product, such as with adhesive glue, tape or other fasteners. As shown in FIG. 10, the composite label can be wrapped around the corners 124 and 126, end 128 and edges 130 of the product. The label can be color coded to correspond to the area where the product is located. Preferably, the label has an electronic product (item) code 132 (FIG. 9) which specifies the product (item) and its contents, and has an electronic section code 134 which specifies the location (e.g., area, section and position) where the product is normally stored.

Figure 9:
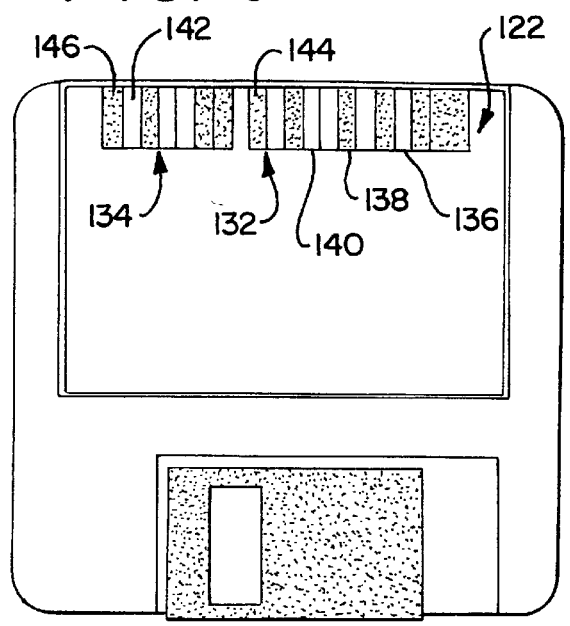
FIG. 9 is a front view of the disc illustrating a coded label with some of the insulating tabs removed to expose the metal contacts.
Figure 11:
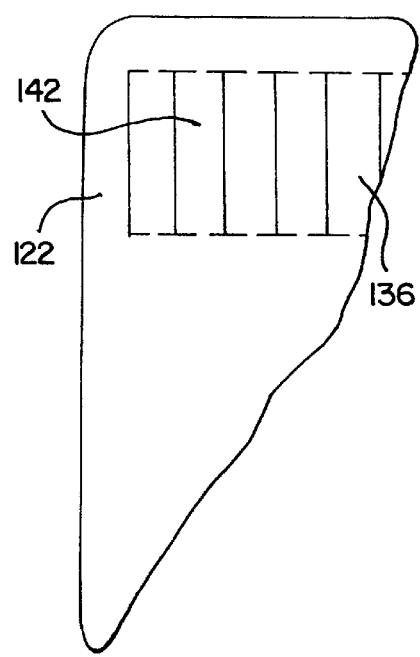
FIG. 11 is a fragmentary front view of the tabs of the label.
Figure 17:
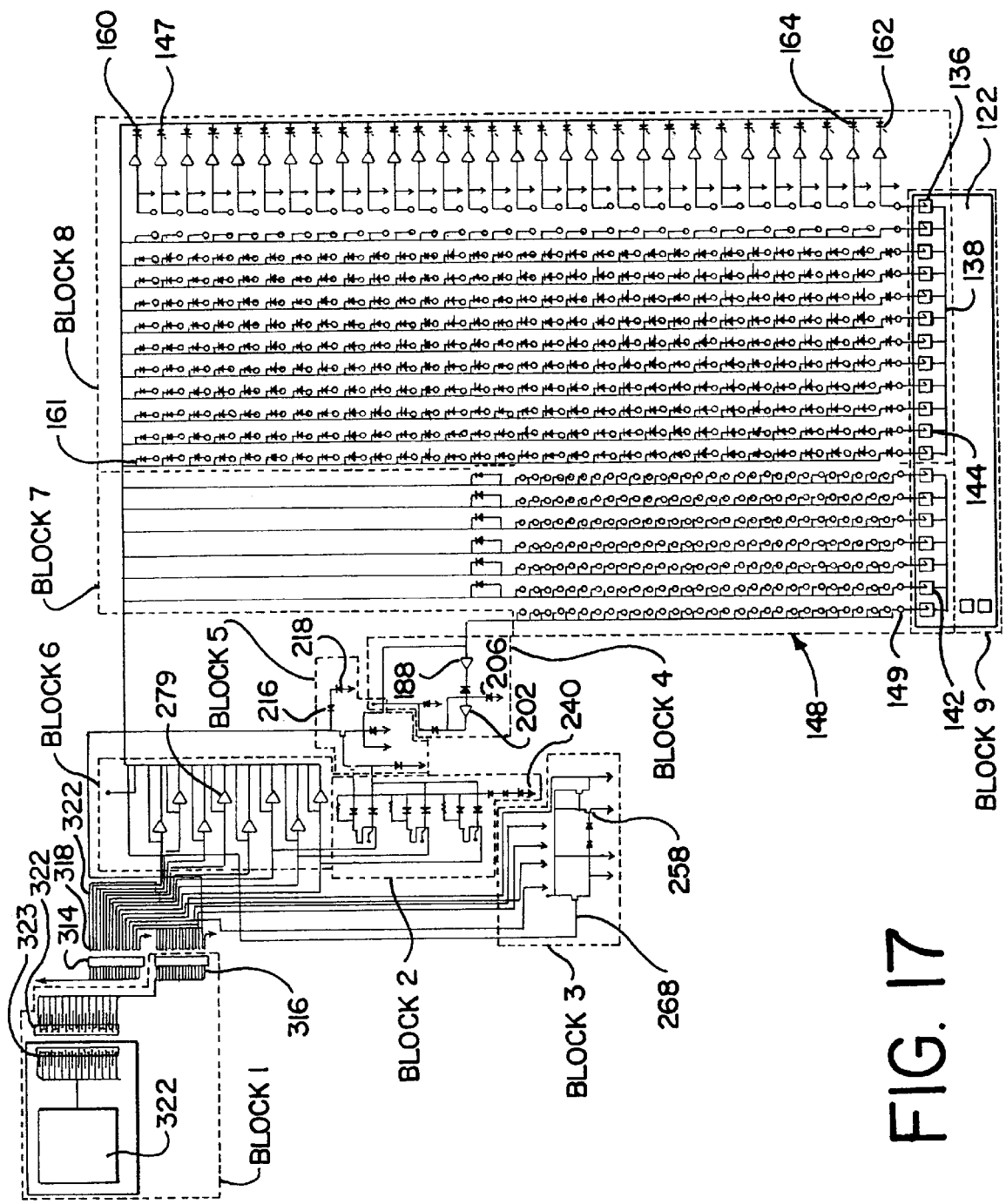
FIG. 17 is a schematic diagram of a control circuit for the locating system and process.

The label has insulating material 136 (FIGS. 8 and 10–12) which detachably overlays an electrically conductive area 138 (FIGS. 9, 10 and 13). The insulating material preferably comprises flexible, precut paper tabs 136 which are removable, although in some circumstances it may be desirable to use removable flexible tabs made of other insulating material, such as plastic, rubber, paperboard, or cardboard. The tabs include insulating product (item) code tabs 140 (FIG. 8) and insulating section code tabs 142. Part of the insulating tabs can be peeled, pulled away or otherwise removed from the label to expose the underlying conductive area and code the label. Removal of the insulating tabs can be done manually, such as with the user's fingers, or can be accomplished with a long nose pliers, tweezers, or other tools or instruments, or with automatic equipment, such as a laser. The tabs have or correspond to zeroes (0s) and ones (1s) of a binary code so a number (code) for the label can be readily selected which is unique for that product and location. The code can also be generated or determined by placing insulating tabs on the conductive label to correspond to a selected code. The conductive area comprises electrically conductive material which provides metal contacts (metal strips) that are preferably made of metal foil or thin gauge metal. The metal contacts include conductive metal, product (item) code contacts 144 (FIG. 13) and conductive metal section code contacts 146. The exposed uncovered metal contacts of the label are coded to correspond to the removed tabs and provide a unique arrangement (pattern) of contacts to electrically engage and contact the signaling devices 147 (FIG. 17) and control circuitry 148 described below, via wire contacts 149 (FIGS. 14 and 15) providing clips, pin edge connectors 150 and 152 (FIG. 16) and wire ribbon cables 154 and 156 on the back wall 158 or surface of a cabinet, rack, shelf, etc. The metal contacts which remain covered by paper tabs providing electrical insulation, are electrically insulated from the wire contacts, pin edge connectors and wire ribbon cables of the signaling devices and control circuitry.

Figure 21:
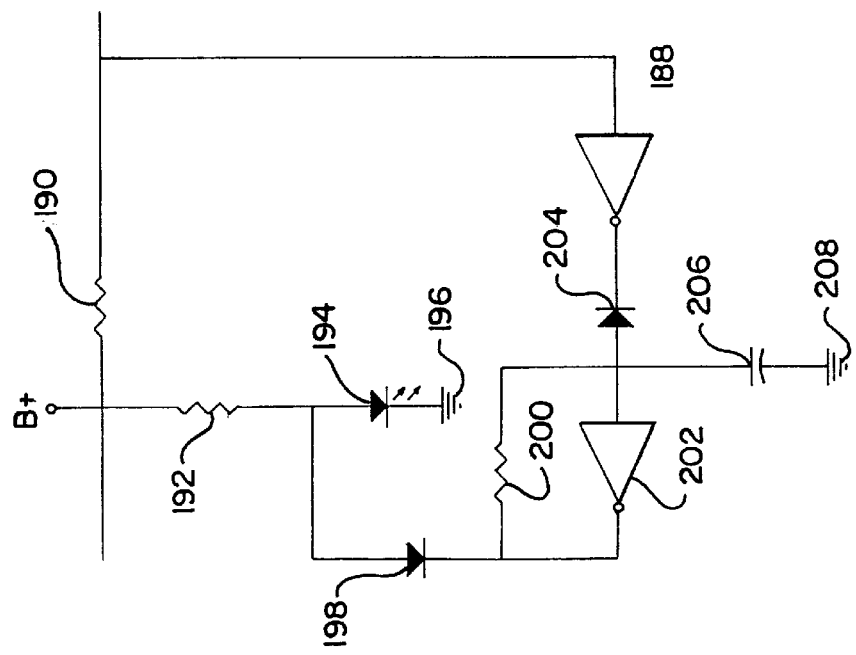
FIG. 21 is a schematic diagram of block 4 of the control circuit.

The signaling devices can comprise an array, series or set of visual signals 147, 160, 162 and 164 (FIG. 24) preferably light emitting diodes (LEDs) which are positioned in proximity to and adjacent the products (items). The LEDs are in electrical contact with the electrically conductive labels on the products via the wire-contacts (clips), pin edge connectors and wire ribbon cables, so that each product (item) is operatively connected to at least one corresponding LED. Preferably, each label is electrically connected to many LEDs. One LED comprising an area LED indicator light can be positioned in the area where the product is located. Another LED 194 (FIG. 21) comprising a section LED indicator light can be positioned in a section of the area where the product is located. A further LED 164 comprising a product (item) LED indicator light can be positioned in close proximity to the product, such as on an adjoining shelf, wall, or other structure. When the LEDs associated with a product are activated, they brightly glow and light up to prominently identify the location of the product for easy retrieval. While LEDs are preferred for best results, in some circumstances, it may be desirable to use other types of signaling devices, such as: lightbulbs, lamps, illuminators or other visual signals, or bells, alarms, or other audible signals.

Figure 20:
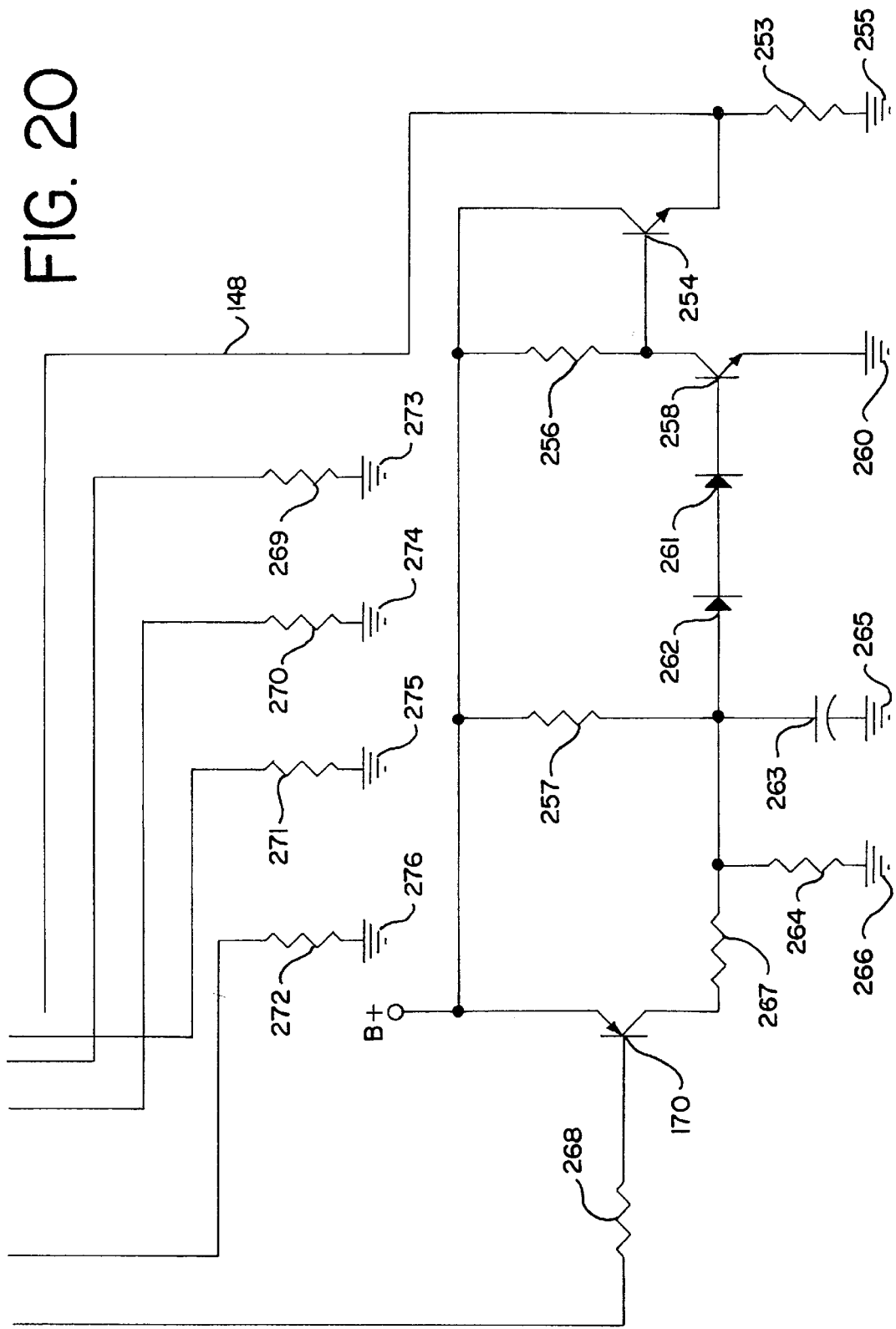
FIG. 20 is a schematic diagram of block 3 of the control circuit.

The control circuit (circuitry) 148 (FIG. 24) activates the LEDs and can comprise inverted buffers 166, resistors 168 and transistors 170 (FIG. 20), as more fully explained hereinafter, which are operatively connected to the LEDs.

Figure 24:
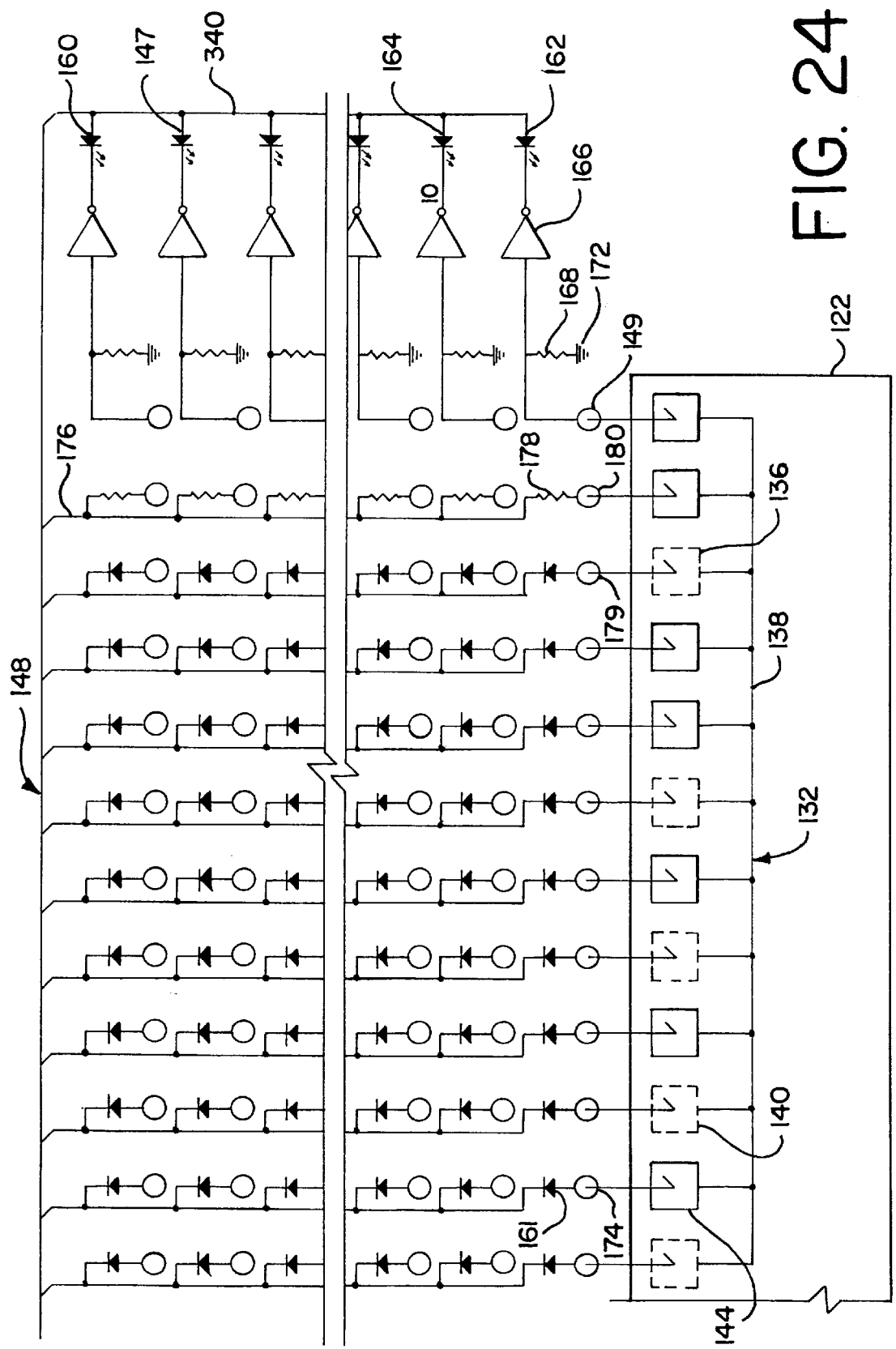
FIG. 24 is a schematic diagram of block 8 of the control circuit.

The schematic diagram of FIG. 24 illustrates block 8 of the control circuit 148 and a schematic diagram of a portion of the electrically conductive label 122. Block 8 provides circuitry to help find the product (item) selected to be retrieved. In block 8, an inverted buffer 166 is connected in series to an LED 162 and to a wire or metal contact (clip) 149. A resistor 168 is connected in parallel to the inverted buffer 166 and to ground 172 (i.e. is grounded). The resistor 168 is also connected in parallel to the wire contact 149. This circuitry is repeated in parallel for other LEDs on the right portion of block 8. On the left portion of block 8, the diode 161 is directly connected in series to a wire or conductive metal contact (clip) 174, which is similar to the wire or metal contact 149. The circuitry is repeated in parallel on the left portion of block 8. Between the left and right portions of block 8, is an intermediate control line 176 with a resistor 178 connected in series to another wire or metal contact (clip) 180, which is similar to wire or metal contact 149. This arrangement (circuitry) is repeated in parallel along intermediate line 176.

Figure 25:
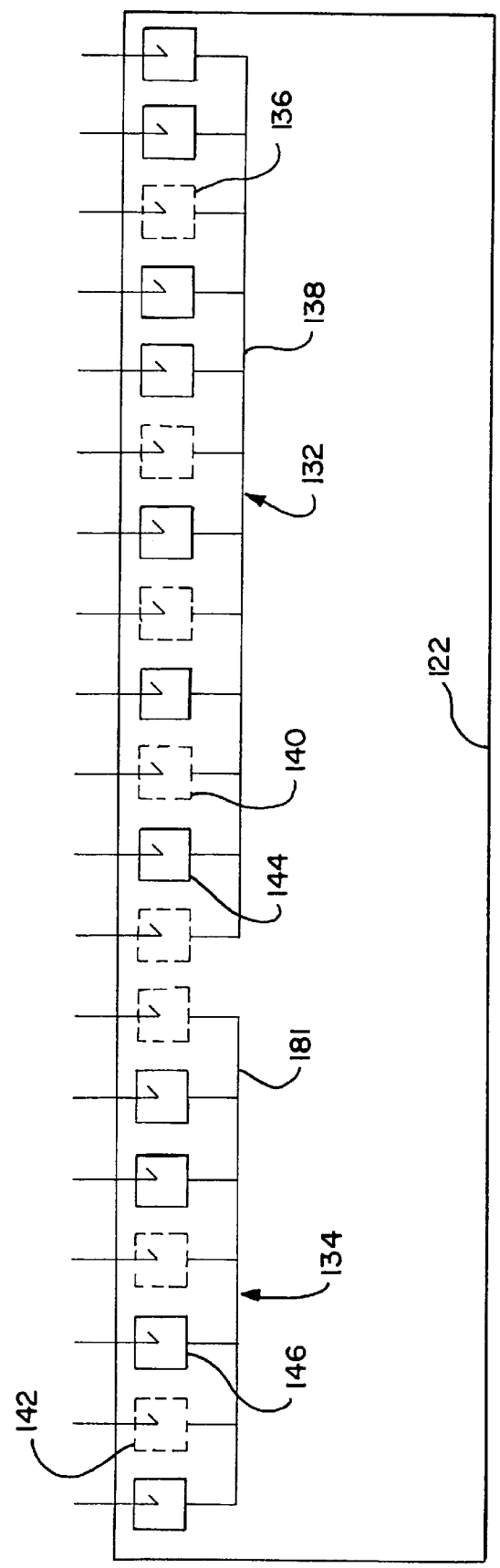
FIG. 25 is a schematic diagram of the label and block 9 of the control circuit.

In the schematic diagram of the electrically conductive label 122 (FIG. 25), product (item) code metal contacts 144 of the label are connected in parallel by electrically conductive material 138 or wires and the section code metal contacts 146 of the label are connected in parallel by electrically conductive material 181 or wires. The electrically conductive material 138 and 181 can be similar and made of metal foil or thin gauge metal. Insulation 136 comprising insulated, product (item) code, paper tabs 140 cover some of the product (item) code metal contacts on the label and correspond to the product (item) code 132. Insulation comprising insulated, section code paper tabs 142 cover some of the section code metal contacts on the label and correspond to the section code 134.

The clips comprising the wire contacts 174 of block 8 (FIG. 24) of the control circuit 148 are in direct contact and connected in series with the uncovered (uninsulated) exposed metal contacts 144 of the electrically conductive label. The insulation 136 comprising product (item) code paper tabs 140 protectively covers, isolates and insulates the insulated covered product (item) code, metal contact from its associated clip (wire contacts) 179 of the control circuit.

Figure 23:
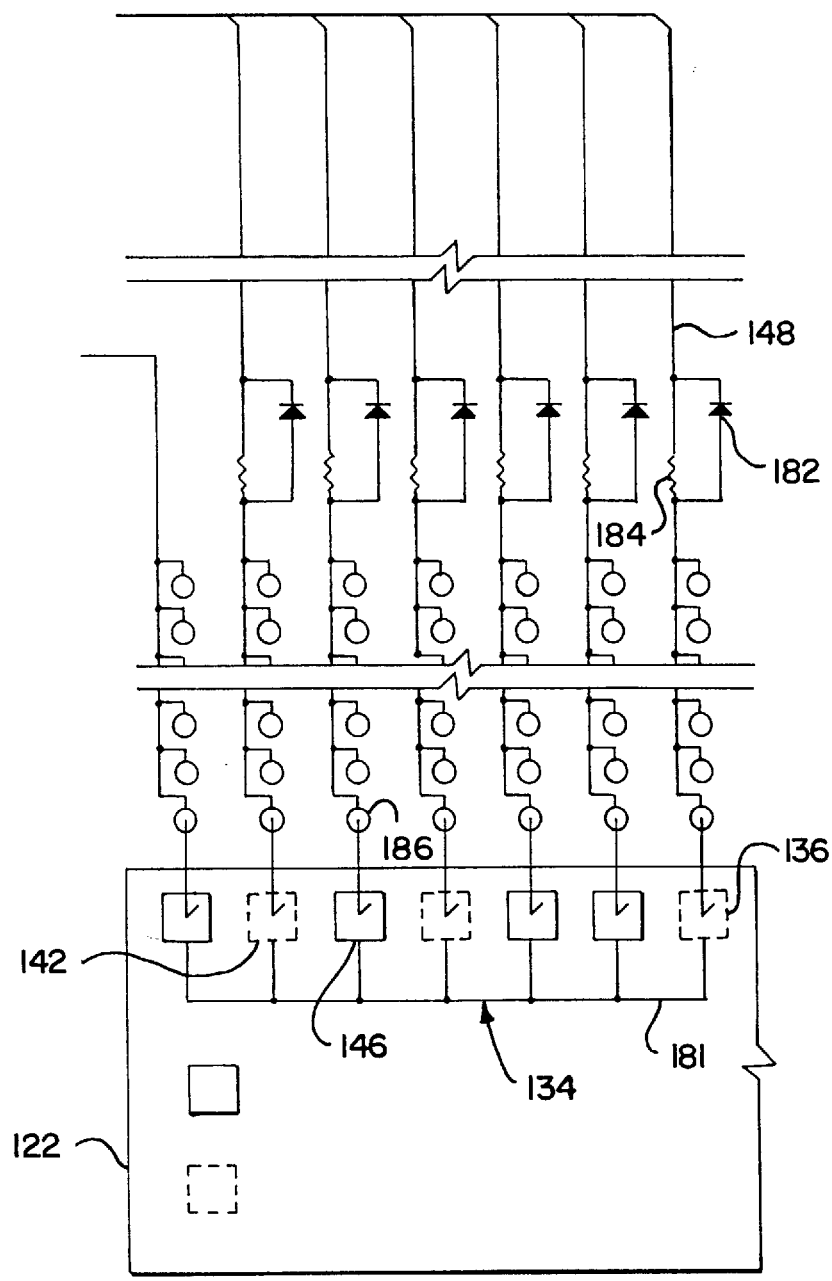
FIG. 23 is a schematic diagram of block 7 of the control circuit.

Block 7 (FIG. 23) of the control circuit 148 checks and finds the section of the area where the product (item) is located. In block 7, diode 182 is connected in parallel to resistor 184. Resistor 184 is connected in series to a parallel set or array of wire or metal contacts (clips) 186, which are similar to the wire or metal contacts (clips) of block 8 discussed above. This circuitry is repeated in parallel in block 7. The wire or metal contacts (clips) 186 are in direct contact and connected in series with the uncovered (uninsulated) exposed, section code metal contacts 146 of the electrically conductive label 122. Insulation 136 comprising section code paper tabs 142 protectively cover, isolate and insulate the insulated covered section code metal contacts from their associated clips (wire contacts) of the control circuit.

Block 4 (FIG. 21) of the control circuit 148 activates and blinks a section LED indicator light if the section contains a wrong product (item); i.e., if product (item) is stored in an incorrect section. In block 4, an inverter 188 or inverter buffer is directly connected to one of the contacts on the left side of block 7 and is connected in parallel to resistor 190. Resistor 190 is directly connected to block 5 of the control circuit and is connected in parallel to a resistor 192. The resistor 192 is positioned between and connected in series to the B+ terminal of a power source or battery and a LED 194. The LED 194 is connected to ground 196 (i.e., is grounded) and is connected in parallel to a diode 198. A resistor 200 is connected in parallel to diode 198, an inverter 202 or inverted buffer, and a diode 204. The diode 204 is positioned between and directly connected to inverters 188 and 202. A capacitor 206 is directly connected to ground 208, i.e., is grounded, and is connected in parallel to resistor 200, inverter 202, and diode 204.

Figure 19:
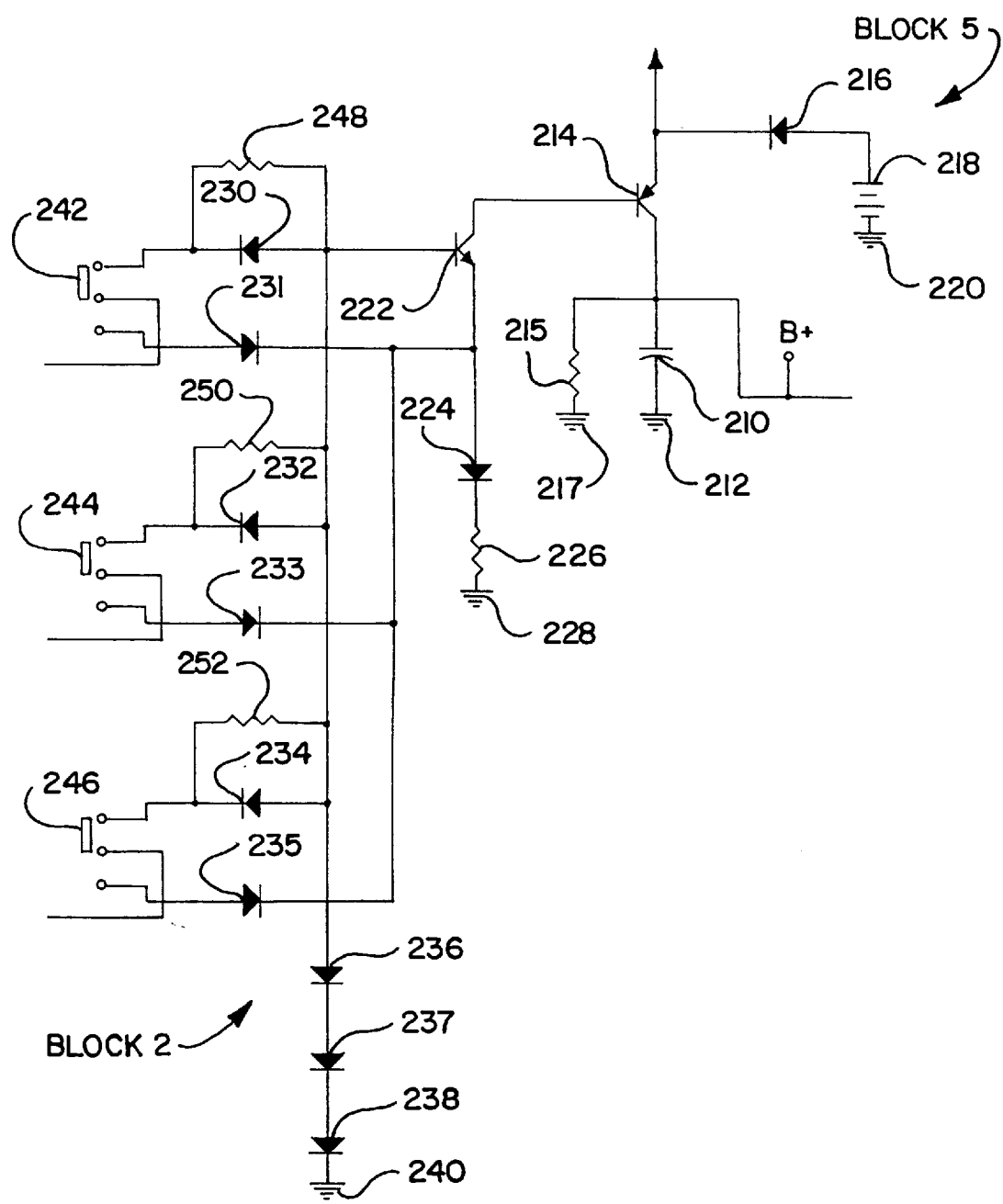
FIG. 19 is a schematic diagram of blocks 2 and 5 of the control circuit.

Block 5 (FIG. 19) of the control circuit is activated (turned on) only when the correct section number (section code) is transmitted. In block 5, a capacitor 210 is directly connected to ground 212, i.e. is grounded, and is connected in parallel to the B+ terminal of block 4, to a transistor 214, and to a resistor 215 which is grounded at ground 217. A diode 216 is positioned between and connected in parallel to transistor 214 and to a pin, such as an edge connection pin. Diode 216 is also directly connected to a power source or battery 218, which is grounded at ground 220. A transistor 222 is directly connected to transistor 214 and is connected in parallel to diode 224. A resistor 226 is directly connected to diode 224 and to ground 228.

Block 2 of the control circuit 148 (on the left side of FIG. 19) sets the section number (section code). In block 2, diodes 230–236 are connected in parallel to transistor 222 of block 5. Diode 237 can be positioned between and connected in series to diodes 236 and 238, which is grounded at ground 240. Switch 242 is connected to diodes 230 and 231. Switch 244 is connected to diodes 232 and 233. Switch 246 is connected to diodes 234 and 235. Resistor 248 is connected in parallel to diode 230. Resistor 250 is connected in parallel to diode 232. Resistor 252 is connected in parallel to diode 234. Diode 236 is also connected in parallel to resistors 248, 250 and 252.

Block 3 (FIG. 20) of the control circuit 148 senses power to determine if the selected product (item) has been found (located). In block 3, a resistor 253 is positioned between and directly connected to a transistor 254 and ground 255. Transistor 254 is connected in parallel to resistors 256 and 257 and transistors 170 and 258, which is grounded at ground 260. Diode 261 is positioned between and connected in series to transistor 258 and diode 262. Diode 262 is connected in parallel to capacitor 263 and resistor 264, which are grounded at ground 265 and 266, respectively. Transistor 170 is connected in series to resistors 267 and 268 and to the B+ terminal of a power supply or battery. Resistor 253 receives current only if the selected product (item) is present. Resistor 253 is connected to a signal device to provide feedback if a selected item is present. Resistors 269–272 are connected between the signal device and ground to provide feedback to any signal device that may be used in the future, e.g. a 4 bit code that tells how many items were found or a signal that the battery is low.

Figure 22:
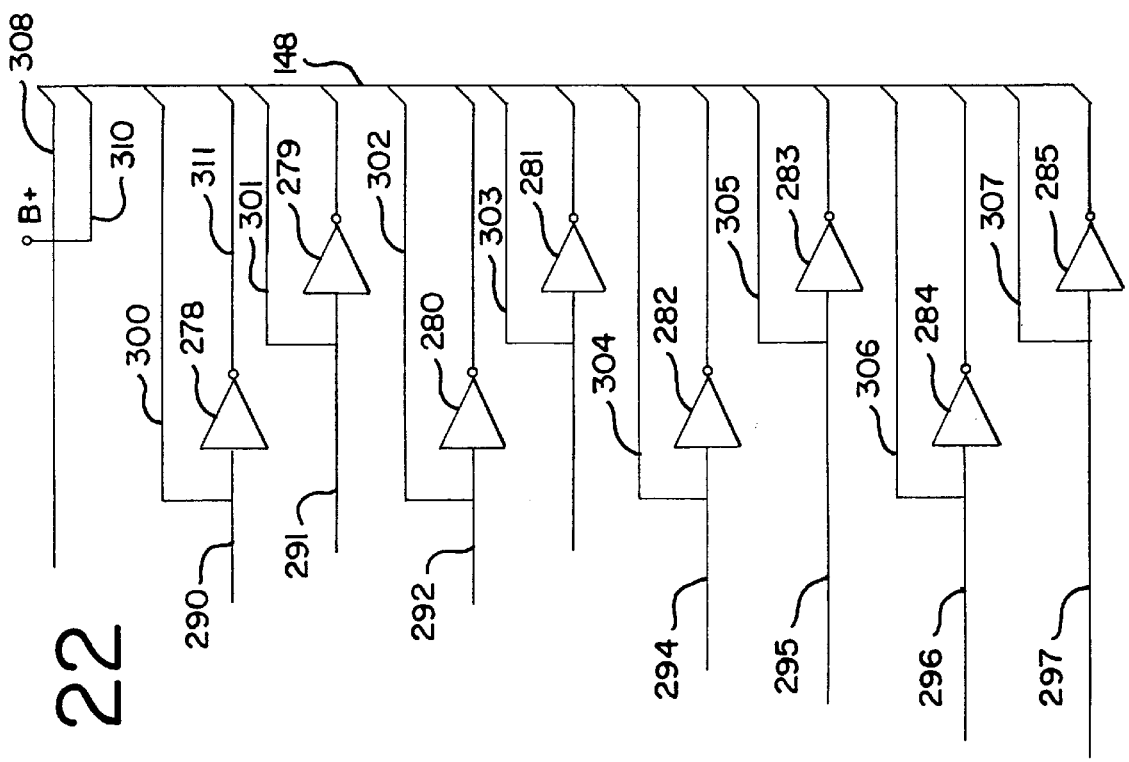
FIG. 22 is a schematic diagram of block 6 of the control circuit.

Block 6 (FIG. 22) of the control circuit 148 creates and emits binary ones and zeroes which are sent (transmitted) to the conductive label. In block 6, inverters 278–285 or inverted buffers are connected in parallel to data lines 290–297 and to bypass lines 300–307, as well as to lines 308 and 310, which is connected to B+ terminal of a power source or battery.

Figure 18:
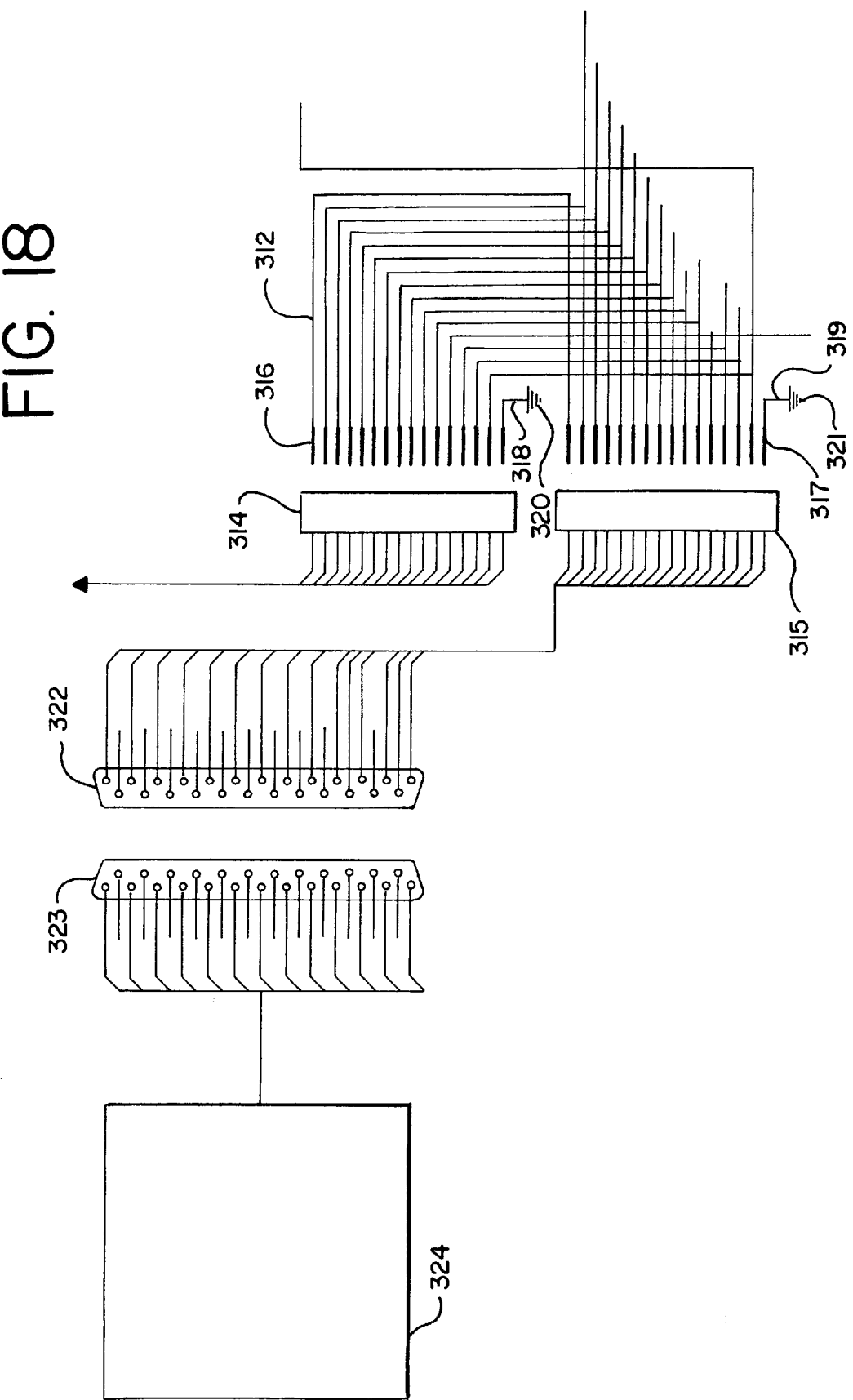
FIG. 18 is a schematic diagram of block 1 of the control circuit.

Block 1 (FIG. 18) of the control circuit 148 plugs into a bus line from the computer printer port. In block 1, lines (wires) 312 are connected to blocks 2, 3, and 6, as well as to pin connectors 314 and 315 via edge connector pins 316 and 317. One of the pin lines 318 and 319 of each pin connector is grounded at ground 320 or 321. Pin connector 315 is connected to a pin connector assembly or plug 322 which plugs into a parallel port 323 of the computer. The parallel port provides a computer printer port 323, which is connected to a computer mother board or logic board 324.

As discussed above, the control circuit is connected to signaling and transmission equipment 330 (FIG. 1) comprising a signal generator which generates binary signals and electrical impulses toward the LEDs and label associated with the product (item) selected to be retrieved. The signaling equipment can comprise a keyboard, computer display screen, and computer 332, microprocessor, or electronic logic board, of a central processing unit (CPU) or can comprise mechanical switches. When the codes for the product and its location are selected and inputted into the signaling equipment, such as with a keyboard of a CPU, the signaling equipment will generate and transmit binary signals (electrical impulses) corresponding to the selected codes to the control circuit. The control circuit shorts and turns off all of the LEDs except the LEDs associated with the selected product (item). The active LEDs will remain lit until the product is retrieved and removed from its normal storage location, wherein the electrically conductive label breaks contact with the control circuit.

The operation of the control circuit, system and process is as follows:

In block 1 (FIG. 18) an input port or plug brings the data (section number and item number) to the printed circuit board. This would normally plug into a line from the computer printer port.

In block 2 and 5 (FIG. 19) the data from the computer can only be a positive voltage or no voltage. If a positive is considered a binary 1 number and no voltage, (or at least a very low voltage) is considered a binary 0 then this block functions as follows:

1. Regardless of the switch settings when all three data inputs that go to the switches 242, 244 and 246 are 0 (or below 1 volt) the transistor 222 has insufficient base voltage to turn on and therefor the transistor 214 is totally off. The battery 218 is disconnected from the circuit. This is the powered down condition.
2. If any switch is set to 0 and the data going to that switch is a 1 (or above 2 volts) the emitter of transistor 222 will be raised above the base and the transistor will turn off. Transistor 214 will be totally off. The battery will be disconnected from the circuit. This is the wrong section condition.
3. The user is instructed that all three switches 242, 244 and 246 in the 1 position is not allowed. This means that one switch will be in the 0 position. If three ones are transmitted on data lines, the power will always be turned off since one of the switches 242, 244 and 246 will raise the emitter of the transistor 222 above the base voltage. Transistor 214 will be totally off. The battery will be disconnected from the circuit. This is the condition for future expansion and can be used to program memory chips on future sections.
4. When the code on the switches 242, 244 and 246 matches the data lines the transistor 222 will turn on. This will activate transistor 214 and supply power to the other circuits. No power was supplied by the battery to activate transistors 222 and 214. Power for activation comes from the computer data lines. Since the input impedance's are very high and buffers could be used on the computers printer port, there is no limit to the number of sections that can be connected to the data output from the computer. This same principle can be used to activate areas.

The block 3 (FIG. 20) circuit is used to tell the computer that the section has been found and the product (item) is or is not in the section. If the section is found, B+ will be turned on as described in block 2. Once the power is on the capacitor 263 will charge through resistor 257. This capacitor will take a few seconds to charge. Transistor 258 will then turn on and a signal will be sent back to the computer. If a product (item) with the correct code is present, then transistor 170 will turn on and charge capacitor 263 much faster. The following three conditions are possible:

1. The section is not connected, the computer receives no signal.
2. The section is connected, but the product (item) is not in the section; the computer gets signal after a few seconds delay.
3. The section is connected and the product (item) is in it; the computer gets the signal immediately. The computer passes this information on to the user.

In block 4 (FIG. 21), if a product (item) is placed in the wrong section, the input of inverter 188 will be grounded (e.g., below 0.5 volts). This will force the output of inverter 188 to go high (e.g. above 4 volts). Diode 204 will be reverse biased and capacitor 206 will not be shorted. This will cause inverter 202 to oscillate at a low frequency forcing LED 194 to blink.

In block 5 (FIG. 19) when the base of transistor 222 is raised higher than its emitter, e.g., by approximately 0.7 volts, it will turn on, drawing current from the base of transistor 214. This will force transistor 214 to go into saturation and thereby provide B+ for all the circuits. Since the current in the system is not very high, the saturation drop on transistor 214 is very small. Therefore, almost all the voltage from battery 218 is usable.

Block 6 (FIG. 22) is used to invert the 8 data lines so both a 1 and a 0 can be sent to the label for each bit of data. In other words, if a 1 is sent to the input 290 of the printer port, then line 300 going to the label will be a 1 and line 311 going to the label will be a 0. If a 0 is sent to input 290 of the printer port line 300 will be a 0 and line 311 will be a 1.

Block 7 (FIG. 23) puts all the section data onto the paper tabs over the first metal foil strip. Since the data for each section is the same on each correctly filed disk (item), the wire contacts are all paralleled without using diodes to isolate them. The paper tabs are kept on (remain) for all the positions that represent a 0 and removed from positions that represent a 1. The data lines have a high resistance 184 connected in series with the data input. This resistance 184 is paralleled by a diode 182. If a paper tab is removed where a 0 is present, the diode 182 is forward biased and shorts the other data lines to ground. The metal foil is brought to a 0 level and the wire connected to the contact shorts the input of inverter 188 (FIG. 21) to ground causing the section light to blink.

Block 8 (FIG. 24) puts all the item data onto the paper tabs over the second metal strip. Diodes 161 are used to prevent any 1 (high voltage) from affecting the foil. Only 0's can short the foil to a low voltage. For each product (item) e.g., a different combination of paper tabs is removed corresponding to the number that will put all 1's on the metal foil. Because the diodes 161 disconnect all 1's, the foil is allowed to go to a high voltage, since none of it's contacts 174 are shorted to 0. The metal foil will go to a high voltage because contact 180 has a resistor 178 connected between B+ and the foil on each label. The voltage on contact 149 will also go high forcing the invertor 166 connected to it to go low at its output and turn on the LED 162 next to the product (item), e.g., with the correct label. If the product (item) is removed, the resistor 168 brings the invertor 166 input back to 0 volts forcing the output high and turning the light off. Whenever a light 160 is turned on, line 340 draws current and the sensor in block 3 sends data back to computer.

In the fail safe process and dependable system, if a product (item) is returned to a different location, other than where it is normally stored, the LEDs associated with the product will activate, light up, and blink. This alerts the user that the product is not stored in its correct location and provides guidance for proper storage, organization, and inventory control.

The fast find locating process and system is a very economical electronic method of finding an item that is stored with numerous items of similar shape and size. Examples of such items could be, but are not limited to, a computer disk, a CD music disk, a book in a library, a video tape, a file in a filing cabinet, or an inventoried item. The only requirement is that each item must have a flat side or other surface upon which a label can be attached in a predetermined position in order to make contact with a number of conductive elements. Therefore, any item that can be stored in a box with one flat side can be located electronically with the fast find locating process and system.

To facilitate large numbers of items being searched, as in a library, data processing center, or video tape store, the fast find locating process and system breaks each search into three divisions: the area, the section of that area, and finally the item. For example, once the correct number is entered into the locating process and system, a light would turn on to indicate the room where the correct filing cabinet is stored (area). Upon entering that room, a person, seeking the product, would see a light indicating the correct filing cabinet (section). After searching each drawer, only one light would be on next to the file with the number desired (item). The locating process and system does not care where the file is placed in the cabinet, it will only light if the label matches the number entered. If an item is put into the wrong section, the fail safe locating process and system would indicate an incorrect filing by blinking the section light. Electrical power will only be activated in the correct area and section, thereby reducing the total system electrical power requirements to the point that batteries become practical for the process and system.

The labels, that identify each item can be identical when attached to the item. A list of binary numbers is used to locate each section and item. After the label is attached, it can be coded by removing precut portions of the label that correspond or match the desired number for both the section and item. The area can be determined by the color of the label. As each paper tab is removed from the label, it exposes a conductive material underneath. These conductive parts of the label will make contact with the clips, when placed in their storage area that complete the circuit to select the correct label. Since the labels are all identical and need only be made of paper and thin strips of metal foil, they are very inexpensive to make. Because the circuitry that lights only the LED next to the correct label is also very inexpensive, the entire fast find locating process and system is a quick, practical, and inexpensive way of locating an item in a large storage system, facility, office, school, library, data processing center, warehouse, store, etc.

Figure 26:
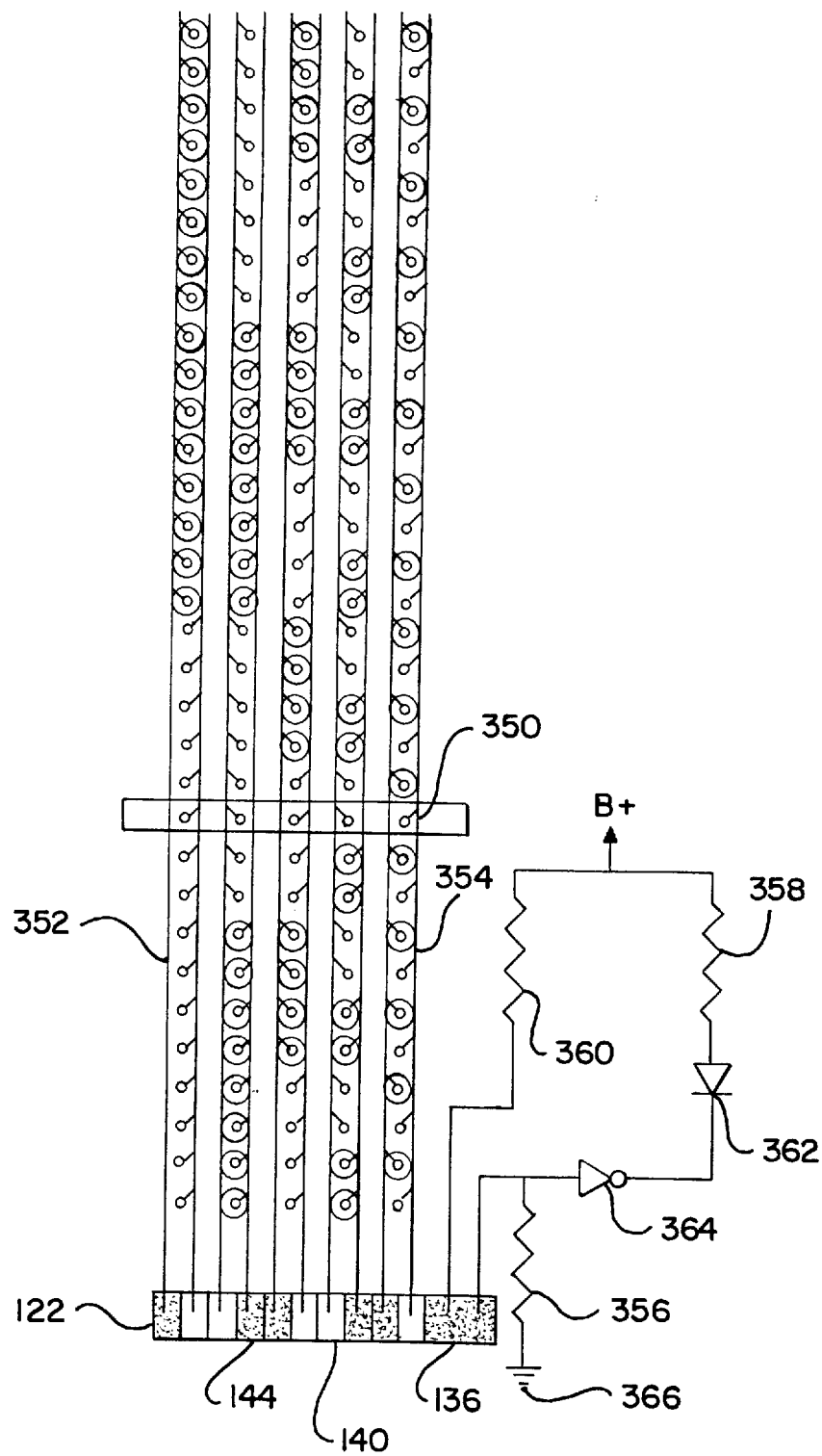
FIG. 26 is a schematic diagram of mechanical switches for use with the locating system and process.

If desired, mechanical switches 350 (FIG. 26) comprising a five bar system can be used instead of block 8 circuitry to help find and locate the product (item) selected to be retrieved. The switches 350 of the five bar system are connected to the metal contacts of the conductive label. When the mechanical switches are positioned and pointed to the left, the switches short the left wires 352. When the switches are positioned and pointed to the right, the switches short the right wires 354. The switches replaces the diode on the left portion of the block 8 circuitry. The right portion of the label is connected in parallel to resistors 356, 358 and 360. Resistors 358 and 360 are in parallel to the B+ terminal of a power supply or battery. An LED 362 is connected in series to resistor 358 and an inverted buffer 364. Resistor 356 is grounded at ground 366.

The process for locating products (items) preferably includes placing and securing an electrically conductive label on the product (item). Desirably, the label comprises a composite label with a metal foil contacts and insulating paper tabs which cover the metal foil contacts. The label is coded by peeling, uncovering and removing some of the tabs from a portion of the metal contacts to designate a product (item) code and a section code which corresponds to the section of the area where the product (item) is located. If desired, the label can be color coded to correspond to the area where the product (item) is located. The labeled product (item) is then stored in its normal location so that the uncovered exposed, coded metal contacts of the label will electronically engage and contact a clip (metal contact) of the electrical control circuit in order to electrically connect the metal contacts of the label with the computer or CPU of a signal generator, which provides the signaling and transmission equipment.

The product (item) desired to be retrieved is electronically inputted, identified and selected, such as via a keyboard and display screen of the computer or CPU. The computer will then generate and transmit signals to activate and light up (glow) the LED section indictor light and the product (item) indicator light in proximity to where the product (item) is located, so that the product can be quickly manually removed and retrieved. The control circuit will short and shut off the other LEDs.

The sequence of steps for storing a product (item) with the fast find locating system and process are: (1) determining the area for storage of the product; (2) determining the section of the area in which the product is to be stored; (3) determining and coding a label number; (4) storing look-up data for future reference; (5) attaching the label to the product; (6) modifying and coding the label to match the look-up data; (7) sending and transmitting the look-up data to the system; (8) placing the product in the proper area and section (activated by the system); (9) checking that the product (item) LED indicator light goes on when the product is stored; and (10) making sure that the section LED indicator light does not blink.

The sequence of steps for finding and locating a product (item) with the fast find locating system and process are: (1) searching the look-up data to determine the label area, section and number; (2) setting the data on the locating system; (3) going to the indicated area section and location with the glowing (lit) LED indicator lights; (4) removing the indicated product (item); and (5) resetting the system.

Among the many advantages of the fast find locating process and system are:

1. Because the labels are flat and can be attached to any flat surface, the labels can be used for a large variety of items.
2. Since the label prevents light from coming on rather than turning light on, there is no searching involved. All the labels in an activated section receive the code simultaneously, but only the proper label will not short out light activating circuit. This provides very fast access time.
3. Because the label prevents light from coming on, a bad contact will turn light on when any sub number is transmitted. This is a fail safe condition that allows bad contacts to be easily found and corrected. If the light only came on when all the correct contacts were made, a bad label contact could not be found easily in a large volume system and the system might indicate the item was not present. In this system, the item will always be found when data contacts are missing. This fail-safe principle may not apply, however to the last two contacts that activate the light. If one of these is open, the light may not light. All other contacts are fail-safe.
4. The system can be totally turned off when wires are used to connect to computer or other activating device such as (a bank of switches). This means that battery operation of remote areas and sections is very practical. Also, in a very large locating system, such as a library, the total power used is minimized.
5. Switching could be done totally mechanical, if desired, such as with mechanical switches.
6. Since area are powered on by computer or a switched bank of switches, there is virtually no limit to the number of codes that could be generated. This allows for a locating system and process that is expandable in the future to any size without making the original system obsolete.
7. If an item is miscoded or placed in the wrong section, a blinking light will indicate a misfiling as soon as the section is activated. Removing the bad item will stop the blinking.
8. The labels and system are very inexpensive to construct.
9. Superior results.
10. Outstanding performance.
11. Speedy search, location and retrieval.
12. Useful with a variety of voluminous items (products).
13. Ability to quickly identity and find items and their contents.
14. Easy to use.
15. Simple to operate.
16. Dependable.
17. Attractive.
18. Economical.
19. Efficient.
20. Effective.

Although embodiments of the invention have been shown and described, it is to be understood that various modifications and substitutions, as well as rearrangements of components, parts and process steps, can be made by those skilled in the art without departing from the novel spirit and scope of this invention.

What is claimed is:

1. A system for locating items, comprising:

a multitude of items comprising products selected from the group consisting of computer disks, software diskettes, video tapes, video tape cases, audio tapes, audio tape cases, compact discs, compact disc cases, computer tape, tape reels, tape cases, software boxes, books, magazines, storage bins, file folders, files, boxes, cartons, and containers;

each of said items having an electrically conductive label, each label being differently coded for designating an item code specifying the item or its contents and a section code specifying the location where said item is normally stored;

an array of signals positioned in proximity to said items, said signals being normally in electrical contact with said electrically conductive labels so that each item is operatively connected to a corresponding signal;

each of said labels having electrically conductive circuitry normally in electrical contact with said signals and having a shunt to short said signal in response to shut-off pulses;

equipment for generating said shut-off pulses to said electrically conductive labels;

a control circuit operatively connecting said equipment to said signals and said labels, and said control circuit includes said shunt in said label and comprises low power fail-safe electronic circuitry for shorting all of said signals except a signal comprising the corresponding signal of the selected item to be retrieved.

2. A system for locating items in accordance with claim 1 wherein:

said signals are selected from the group consisting of audible signals, bells, alarms, visual signals, lights, lightbulbs, lamps illuminators, light emitting diodes, release mechanisms, and signaling devices; and said equipment is selected from the group consisting of mechanical switches, a central processing unit, a computer, an electronic logic board, and a microprocessor.

3. A system for locating items in accordance with claim 1 including:

a first set of visual signals positioned in a section of an area where said items are located;

a second set of visual signals positioned adjacent said items; and said control circuit shorting and shutting off said second set of signals except said second signals associated with the item to be retrieved, items associated with failed contacts, and items insulated by a failure to short out said second signals in response to said shut-off pulses.

4. A system for locating items in accordance with claim 1 wherein:

said electrically conductive label comprises a composite label with an insulating material overlying a conductive area comprising an electrically conductive material selected from the group consisting of metal, metallic foil, copper and conductive ink; and said insulating material is selected from the group consisting of paper, paper tabs, paperboard, cardboard, plastic, rubber zinc oxide, tin oxide and non-conductive material; and different parts of said insulating material are selectively removed for designating said item code and said section code for each item.

5. A system for locating items in accordance with claim 1 wherein:

said electrically conductive circuitry of said labels comprises metal contacts;

said signals comprise light emitting diodes; and said control circuit comprises inverted buffers operatively connected to said light emitting diodes, and resistors and transistors operatively connected to said inverted buffers.

6. A system for locating items, comprising:

electrically conductive labels for attachment to items selected from the group consisting of computer disks, software diskettes, video tapes, video tape cases, audio tapes, audio tape cases, compact discs, compact disc cases, software boxes, computer tape, tape reels, tape cases, books, magazines, storage bins, file folders, files, boxes, cartons, and containers; and said electrically conductive labels comprising electronic codes including an electronic item code specifying the item or its contents and an electronic section code specifying the location where the item is normally stored;

electrically conductive circuitry normally contacting said labels to signals operatively associated with said items; and shunts for shorting signals associated with said items in response to shut-off pulses, wherein a control circuit generates shut-off pulses that comprise codes for selected labels to short signals corresponding to all labels except the selected labels having the selected label codes.

7. A system for locating items in accordance with claim 6 wherein:

said electrically conductive label comprises a composite label with an insulating material overlying a conductive area;

said conductive area comprises an electrically conductive material selected from the group consisting of metal, metallic foil, copper and conductive ink; and said insulating material is selected from the group consisting of paper, paper tabs, paperboard, cardboard, plastic, rubber zinc oxide, tin oxide and non-conductive material: and different parts of said insulating material are selectively removed for designating said item code and said section code for each item.

8. A system for locating items in accordance with claim 6 wherein said electrically conductive circuitry of said labels comprise metal contacts.

9. A system for locating items in accordance with claim 6, wherein said signals are selected from the group consisting of audible signals, alarms, bells, visual signals, lights, lightbulbs, lamps, light emitting diodes, illuminators, and signaling devices.

10. A system for locating items in accordance with claim 9 including:

equipment for generating said shut-off pulses, said equipment being selected from the group consisting of mechanical switches, a central processing unit, a computer, an electronic logic board, and a microprocessor; and said location specified by said section code comprises at least one signal position selected from the group consisting of an area where said item is located, a section of an area where said item is located, and a specific location in proximity to said item.

11. A process for locating items, comprising the steps of:

storing coded items in a system;

emitting a signal from each stored item location in the system;

providing a shut-off signaling method to electronically identify an item to be retrieved in the system;

insulating the item to be retrieved via its code;

generating shut-off pulses with said shut-off signaling method to short, shut-off and deactivate said signals from all items in the system except the insulated item to be retrieved so as to shunt and electronically eliminate all signals from the items except the insulated item; and retrieving the insulated item in an area where the insulated item is located.

12. A process for locating items in accordance with claim 11 wherein said items are selected from the group consisting of: computer discs, software diskettes, video tapes, video tape cases, audio tapes, audio tape cases, computer tapes, tape reels, tape cases, compact discs, compact disc cases, software boxes, books, magazines, file folders, files, boxes, cartons and containers.

13. A process for locating items in accordance with claim 11 wherein:

said signal is selected from the group consisting of an alarm, a visual signal, a mechanical signal, an audible signal, and a light; and said signal is emitted from a signal emitter selected from the group consisting of a bell, light emitting diode, lightbulb, lamp, illuminator, release mechanism, and signaling device.

14. A process for locating items in accordance with claim 11 wherein said shut-off signaling method utilizes an apparatus selected from the group consisting of: mechanical switches, a central processing unit, a computer, an electronic logic board, and a microprocessor.

15. A process for locating items in accordance with claim 11 including electronically identifying a location with an incorrectly stored item.

16. A process for locating items in accordance with claim 11 wherein said insulating includes placing a composite label on said item to be retrieved.

17. A process for locating items in accordance with claim 16 wherein:
   said composite label comprises a conductive area and insulating material overlying said conductive area; and
   coding said composite label by removing some of said insulating material to designate an item code and a section code corresponding to a section in the area where said item is located.

18. A process for locating items in accordance with claim 17 wherein said conductive area comprises an electrically conductive material selected from the group consisting of: metal, metallic foil, copper, and conductive ink.

19. A process for locating items, comprising the steps of:
   storing items wherein each of said items is selected from the group consisting of a computer disc, software diskette, video tape, video tape cartridge, video tape case, audio tape, audio tape case, compact disc, compact disc case, computer tape, tape reel, tape case, software box, book, magazine, storage bin, file folder, and file;
   generating a first visual signal in a section of an area where each item is located;
   generating a second visual signal in proximity to each item;
   insulating an item to be retrieved;
   shorting and shutting off all of said second visual signals except said insulated item to be retrieved to shunt, prevent and electronically eliminate second visual signals from all items except said insulated item; and
   retrieving the insulated item in the area where said second visual signals have not been shorted.

20. A process for locating items in accordance with claim 19 wherein said shorting includes electronically sending shut-off pulses to said items with an apparatus selected from the group consisting of: mechanical switches, a central processing unit, a computer, an electronic logic board, and a microprocessor.

21. A process for locating items in accordance with claim 20 including:
   placing and securing a composite label on each item, each composite label having a metal contact and paper tabs covering said metal contact;
   coding said label by peeling, uncovering and removing some of said tabs from a portion of said metal contact to designate an item code and a section code corresponding to the section of the area where said item is located; and
   electronically engaging and contacting said uncovered metal contact with electronic circuitry electrically connecting said metal contact of said composite label with said apparatus.

* * * * *